United States Patent [19]

Tomita et al.

[11] Patent Number: 5,065,153
[45] Date of Patent: Nov. 12, 1991

[54] CONTENTION CONTROL SYSTEM
[75] Inventors: Eizo Tomita; Yutaka Asai, both of Tokyo, Japan
[73] Assignee: Oki Electric Industry Co., Ltd., Minatoku, Japan
[21] Appl. No.: 211,555
[22] Filed: Jun. 24, 1988
[30] Foreign Application Priority Data Jun. 30, 1987 [JP] Japan .............................. 62-161358

[51] Int. Cl.⁵ ............................................. H04Q 9/00
[52] U.S. Cl. ............................ 340/825.5; 340/825.51; 370/85.2
[58] Field of Search ..................... 340/825.5, 825.51; 370/85, 85.2

[56] References Cited
U.S. PATENT DOCUMENTS

| | | | |
|---|---|---|---|
| 4,292,623 | 9/1981 | Eswaran et al. | 340/825.5 |
| 4,556,939 | 12/1985 | Read | 364/200 |
| 4,638,311 | 1/1987 | Gerety | 340/825.5 |
| 4,652,873 | 3/1987 | Dolsen et al. | 340/825.5 |
| 4,755,990 | 7/1988 | Bohler et al. | 370/85 |
| 4,807,223 | 2/1989 | Wells | 370/85 |

FOREIGN PATENT DOCUMENTS 1480208  7/1977  United Kingdom.
2101457  1/1983  United Kingdom.

OTHER PUBLICATIONS

Canadian Office Action, 2 pages, 5/25/90.
"The Ethernet, A Local Area Network, Data Link Layer and Physical Layer Specifications, Version 1.0," Sep. 30th 1980, Digital Equipment Coporation, Intel Corporation, Xerox Corp.

Primary Examiner—DOnald J. Yusko
Assistant Examiner—Peter Weissman
Attorney, Agent, or Firm—Spencer & Frank

[57] ABSTRACT

A contention control system for a shared communication medium has a separate control line. Functional modules contend on the control line for use of the communication medium. The system is simple and inexpensive, and avoids data collisions.

13 Claims, 7 Drawing Sheets

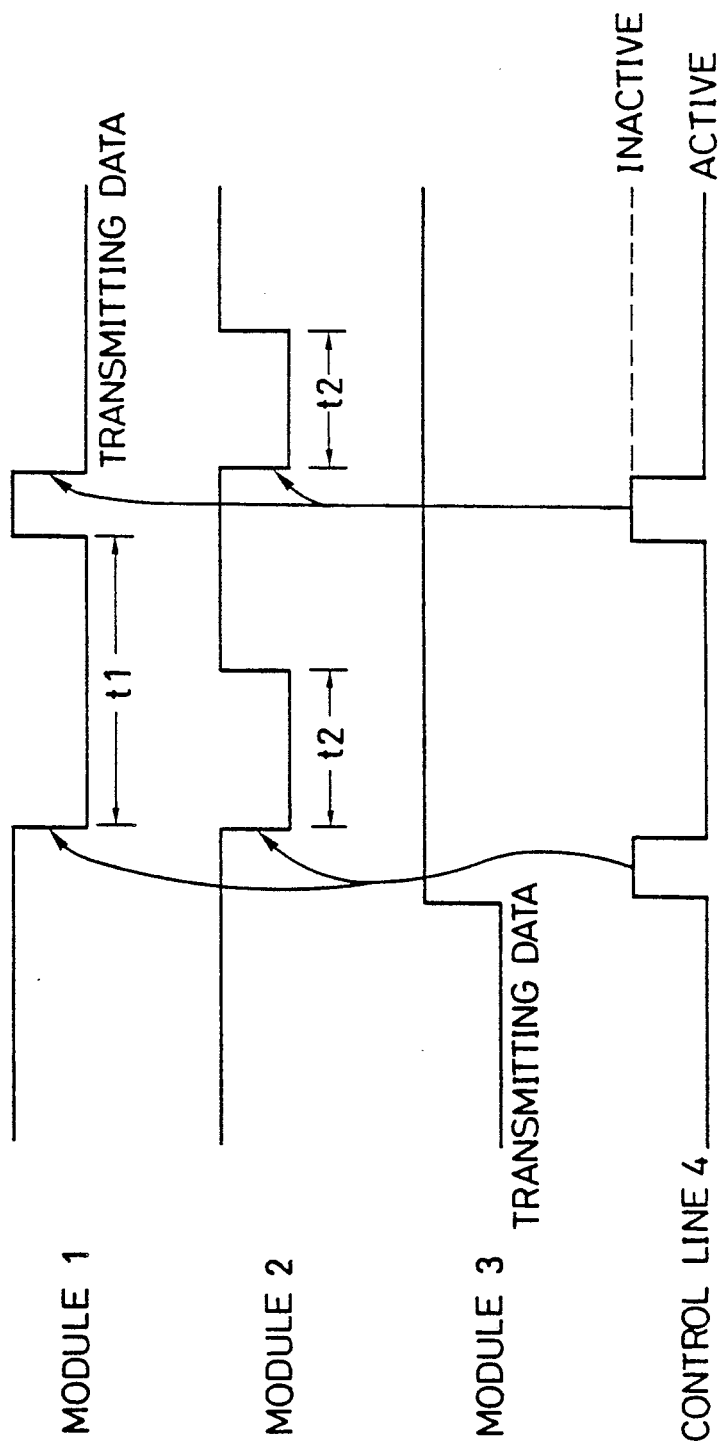

CONTENTION CONTROL SYSTEM

BACKGROUND OF THE INVENTION

This invention relates to a contention control system for a shared communication medium.

Contention control systems are used in systems such as local area networks (LANs) in which a single communication medium is shared by a plurality of independent functional modules such as computers and terminal equipment. Contention refers to a state in which two or more functional modules are trying to use the common communication medium at the same time. If two or more functional modules actually transmit data on the common communication medium at the same time, the data are said to collide. The purpose of the contention control system is to resolve contention and control or avoid data collisions.

One common contention control system is the CSMA/CD (Carrier Sense Multiple Access with Collision Detection) system. This system is used, for example, in the Ethernet local area network. FIG. 1 is a block diagram showing the Ethernet line interface section.

The common communication medium in FIG. 1 is a coaxial cable 11 to which independent functional modules A 12, N 15, etc. are connected. Each functional module has a line interface section comprising a physical layer 13 that is electrically and physically coupled to the communication medium, and a data link layer 14 the primary function of which is error control of the transmitted and received data. In the physical layer, 13a is a transmit channel access unit comprising a driver circuit for sending transmit data to the communication medium, 13b is a transmit data encoder for sending transmit data to the transmit channel access unit according to a fixed encoding rule, 13c is a receive channel access unit for receiving signals from the communication medium, 13d is a receive data decoder for decoding received data according to an encoding rule, 13e is a collision detect unit for detecting the state of contention on the communication medium, and 13f is a carrier detect unit that is coupled to the receive channel access unit for recognizing when data transmission is present on the communication medium.

FIG. 2 is a flowchart of the Ethernet contention control procedure. This procedure is explained next.

To transmit data, the data link layer 14 first checks the carrier detect unit via a lead 17 to ascertain that no other functional module, the functional module N 15 for instance, is transmitting data; then it begins data transmission. The transmit data are routed through the transmit data encoder 13b to the transmit channel access unit 13a, then placed on the communication medium 11. The encoded transmit data are also furnished to the collision detect unit 13e.

The collision detect unit 13e compares the encoded transmit data with the receive data received from the communication medium via the receive channel access unit. If the two data do not match, presumably due to a collision with data transmitted on the communication medium by another functional module, the collision detect unit 13e notifies the data link layer of the unmatch via a lead 16. Upon receiving such notification, the data link layer stops sending data and prepares to resume transmission later.

Another well-known contention control system is found in the physical layer (layer 1) of the basic interface (I interface) described in recommendation I.430 in the Integrated Services Digital Network (ISDN) I series of recommendations of the CCITT. This recommendation stipulates the use of special D and E channels for detecting collisions when two or more functional modules attempt to access the communication medium simultaneously.

FIG. 3 is a block diagram of layer 1 of an ISDN network with this CCITT interface. The network includes a network termination (NT) unit 21 having an echo generator 21a connected to a downstream communication medium 22 and an upstream communication medium 23, both of which comprise two-wire metallic lines. In the drawing, a transmit data frame 26 is shown on the upstream communication medium 23. The frame comprises several channels, one of which is a one-bit D channel 26a. The network termination unit 21 receives the transmit data frame 26 and the echo generator 21a adds an echo signal E which it creates by copying the D-channel data 26a. The resulting frame is placed on the downstream communication medium 22 as the receive data frame 27.

Functional modules (TE—terminal equipment) such as the modules TEA 24 and TEN 25 are connected to the two media 22 and 23. The line interface in each functional module comprises a data transmitter 24a, a data receiver 24b, a comparator for comparing transmit data with echo data 24c, and a D-channel supervisory unit 24d.

FIG. 4 shows a flowchart of the I interface D-channel access operation. When a functional module has data to transmit, it executes a fixed procedure including a check that the D channel is free, then sends data from the data transmitter 24a. The transmit data are synchronized with a D bit which is placed in the D channel, and which is also stored in the comparator 24c. The network termination unit 21 echoes each bit sent on the upstream D channel back through the echo channel (E) provided in the downstream direction. In the comparator 24c, the functional module compares the echo bits received via the echo channel with the D channel bits that were transmitted. As long as the D and E bits match, the functional module continues transmission. If the D and E bits do not match, the functional module halts transmission. Thus when contention between two functional modules occurs, a collision on the D channel will cause one of two contending functional modules to detect an unmatch between the D and E channels, and this functional module will drop out, leaving the communication medium in the possession of the other functional module.

Three drawbacks of the two contention control systems described above are that:

(a) Complex supervisory hardware is required to detect availability of the communication medium.

(b) Hardware is necessary to compare the transmitted and received data.

(c) A procedure for retransmitting data is required, because contention cannot be detected until data transmission begins.

A resulting problem is that these systems are too expensive for use by comparatively low-cost functional modules sharing a short-distance common communication medium.

SUMMARY OF THE INVENTION

An object of this invention is to provide a simple, low-cost contention control system. The system comprises a control line and control means for checking the control line prior to data transmission, waiting for the control line to become inactive, activating the control line for a predetermined contention interval, then checking the control line again and either reverting to the waiting state if the control line is still active or, if the control line is inactive, reactivating the control line, commencing data transmission, and holding the control line active for the duration of the data transmission.

BRIEF DESCRIPTION OF THE DRAWINGS

FIG. 7 is a timing chart illustrating the operation of the contention control system of this invention.

DETAILED DESCRIPTION OF THE PREFERRED EMBODIMENTS

Figure 1:
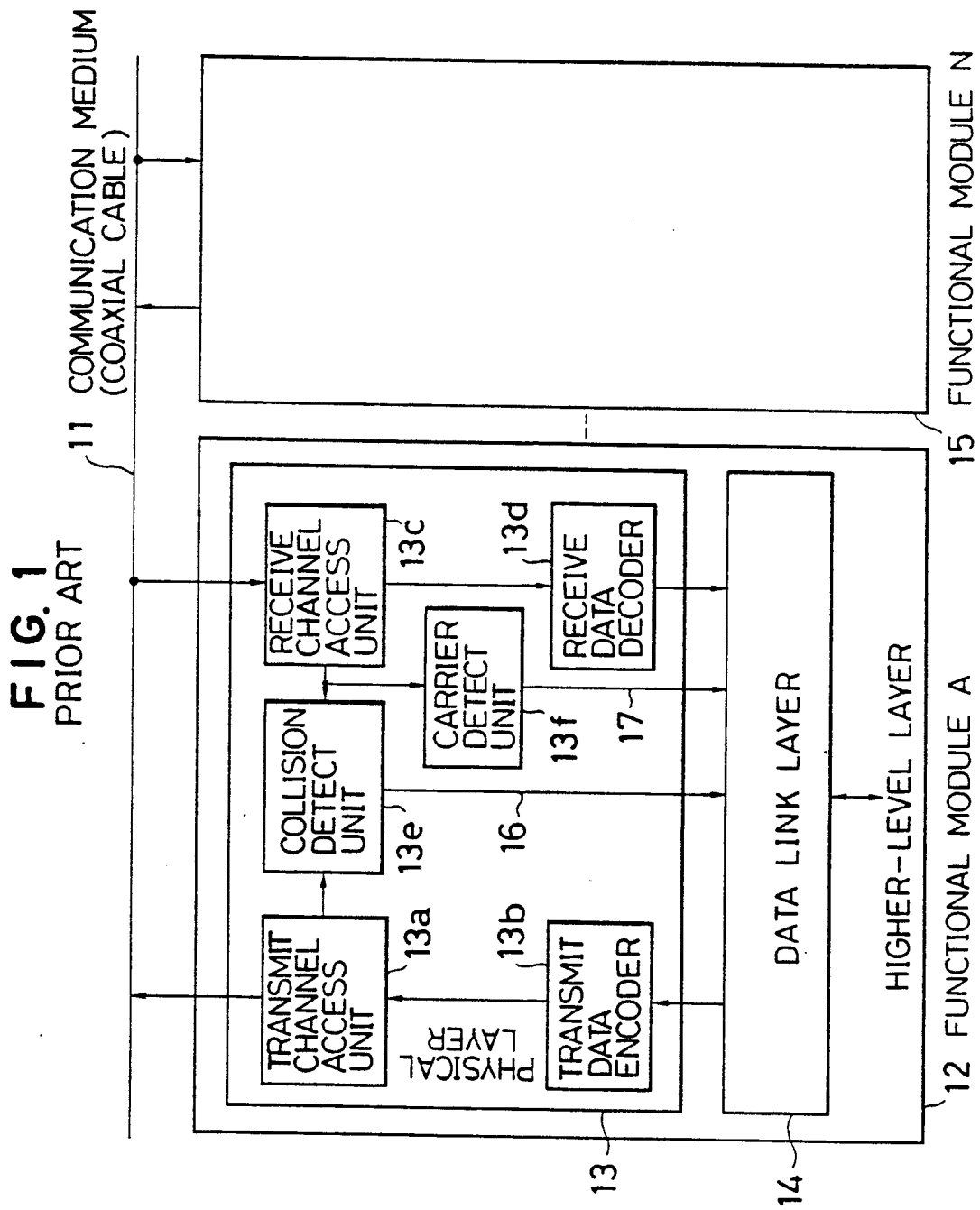
FIG. 1 is a block diagram illustrating the Ethernet line interface.
Figure 2:
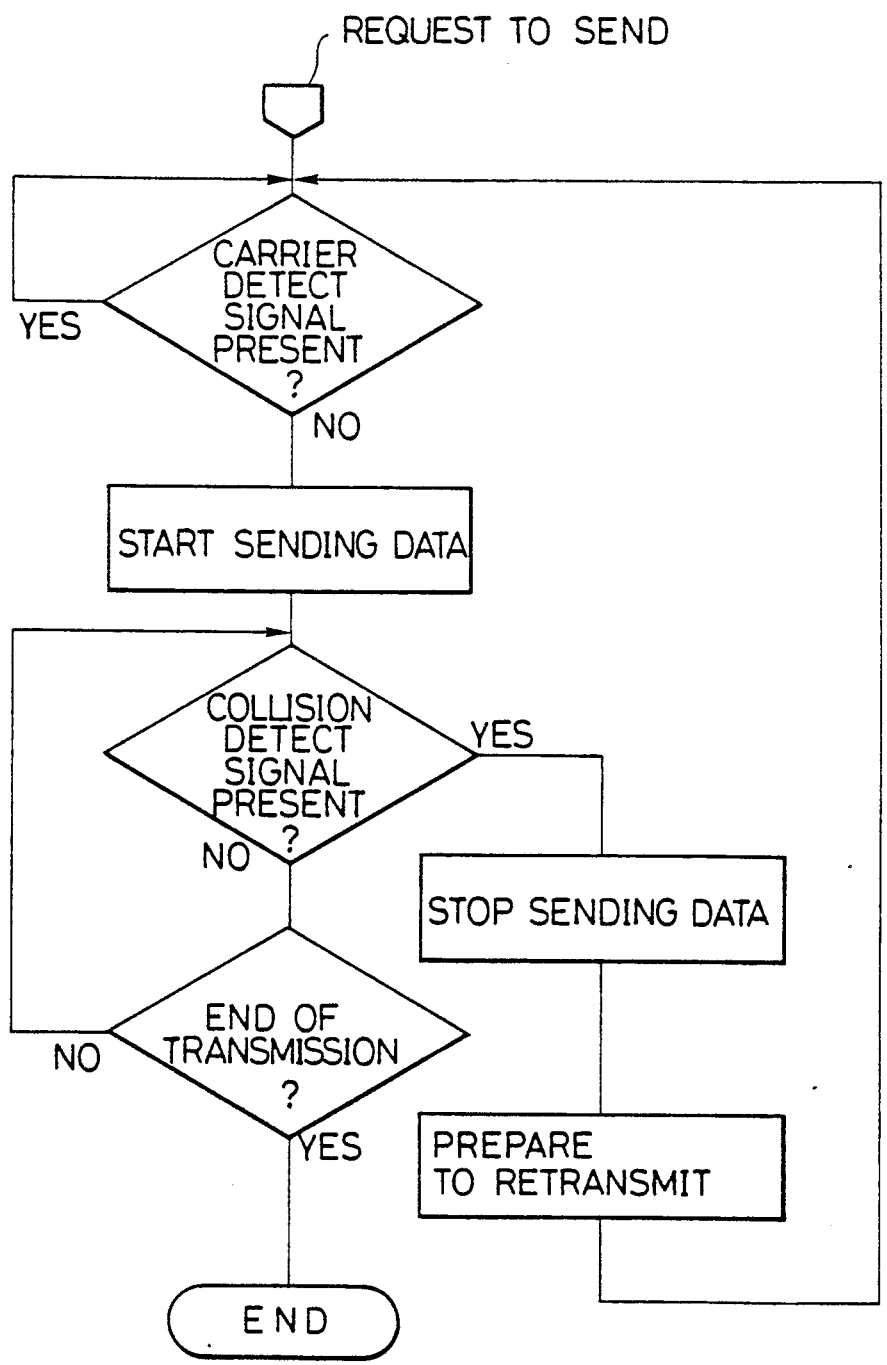
FIG. 2 is a flowchart of the Ethernet contention control system.
Figure 3:
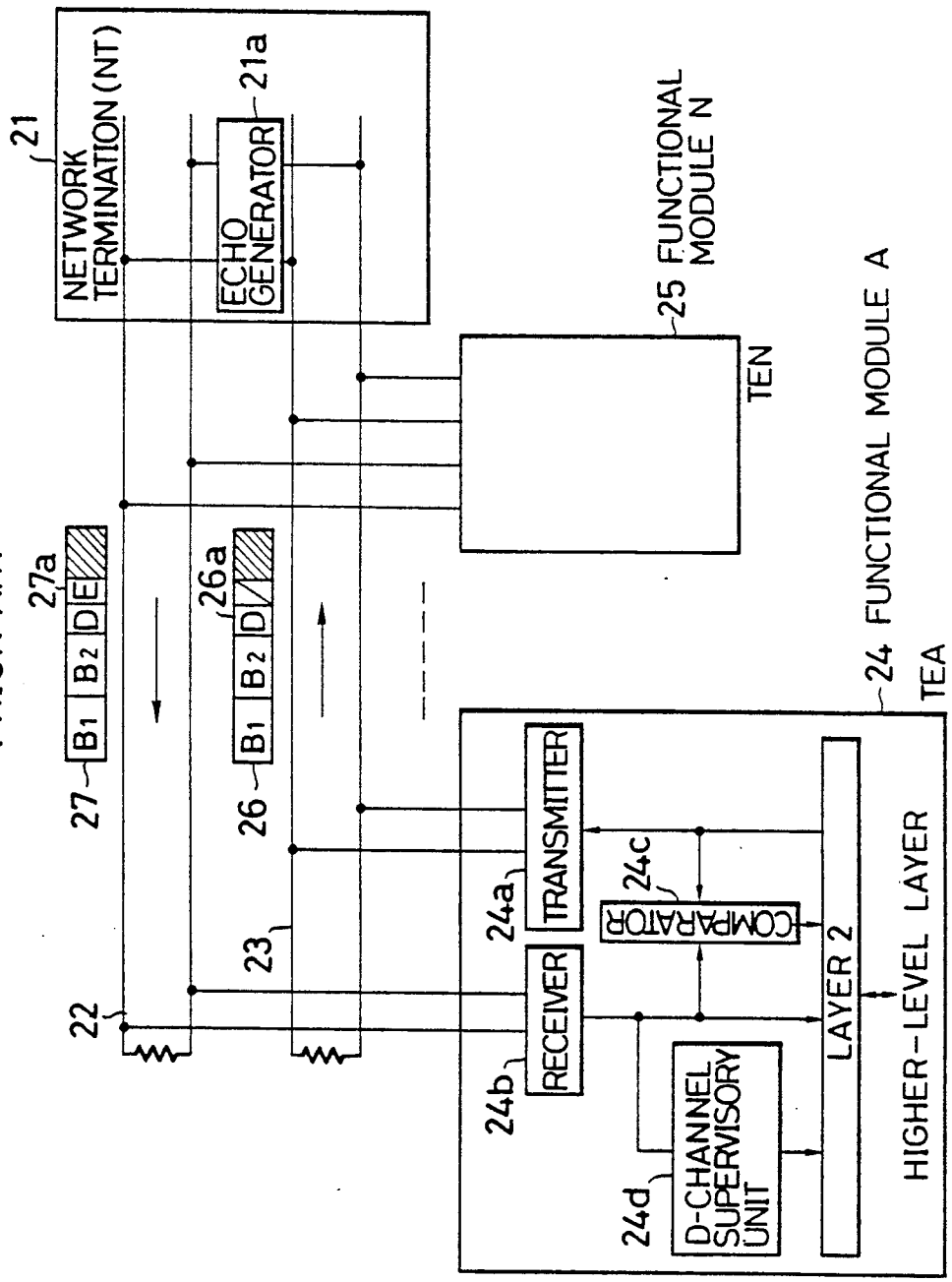
FIG. 3 is a block diagram of the I interface recommended by the CCITT for use in ISDN.
Figure 4:
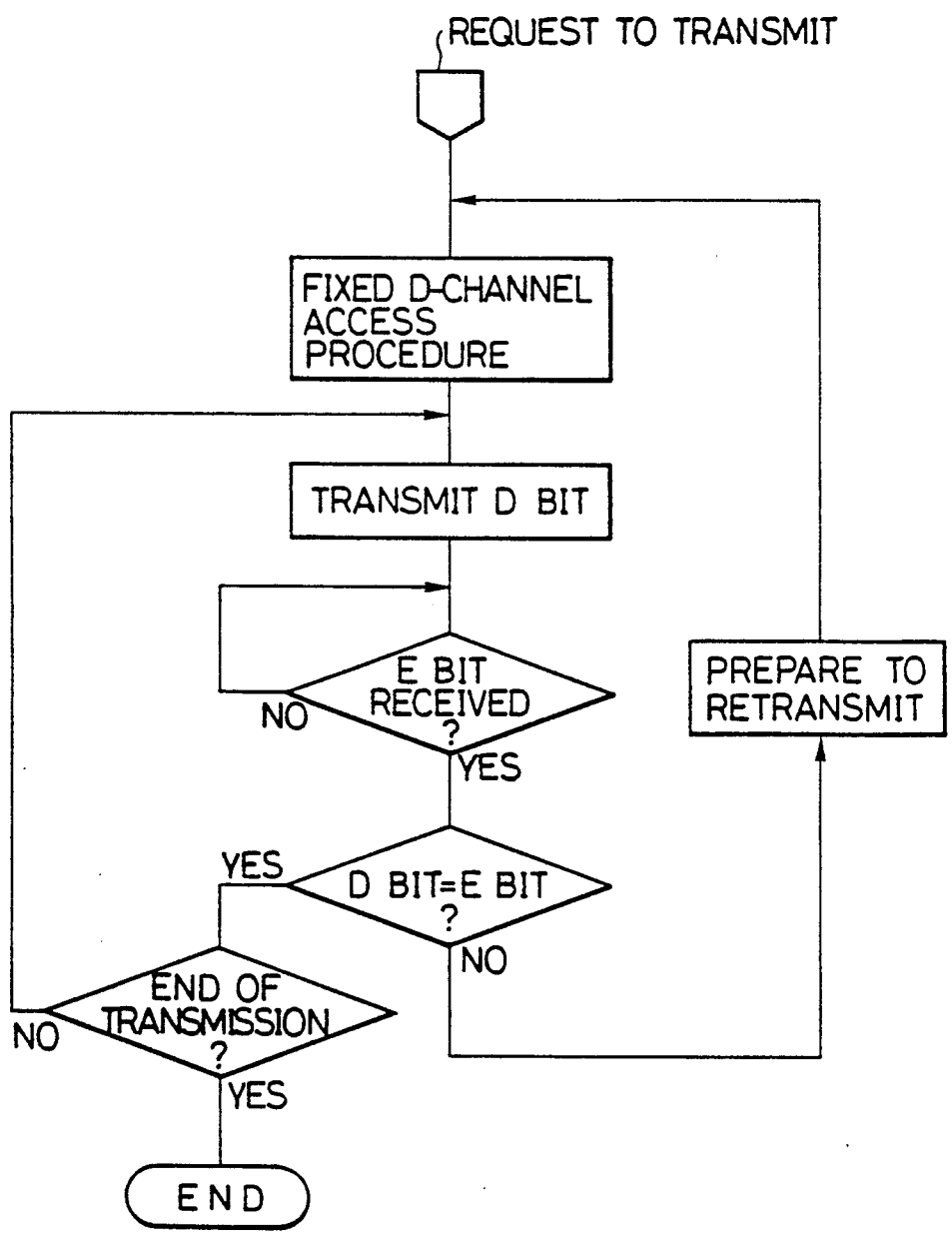
FIG. 4 is a flowchart of the I interface contention control system.
Figure 5:
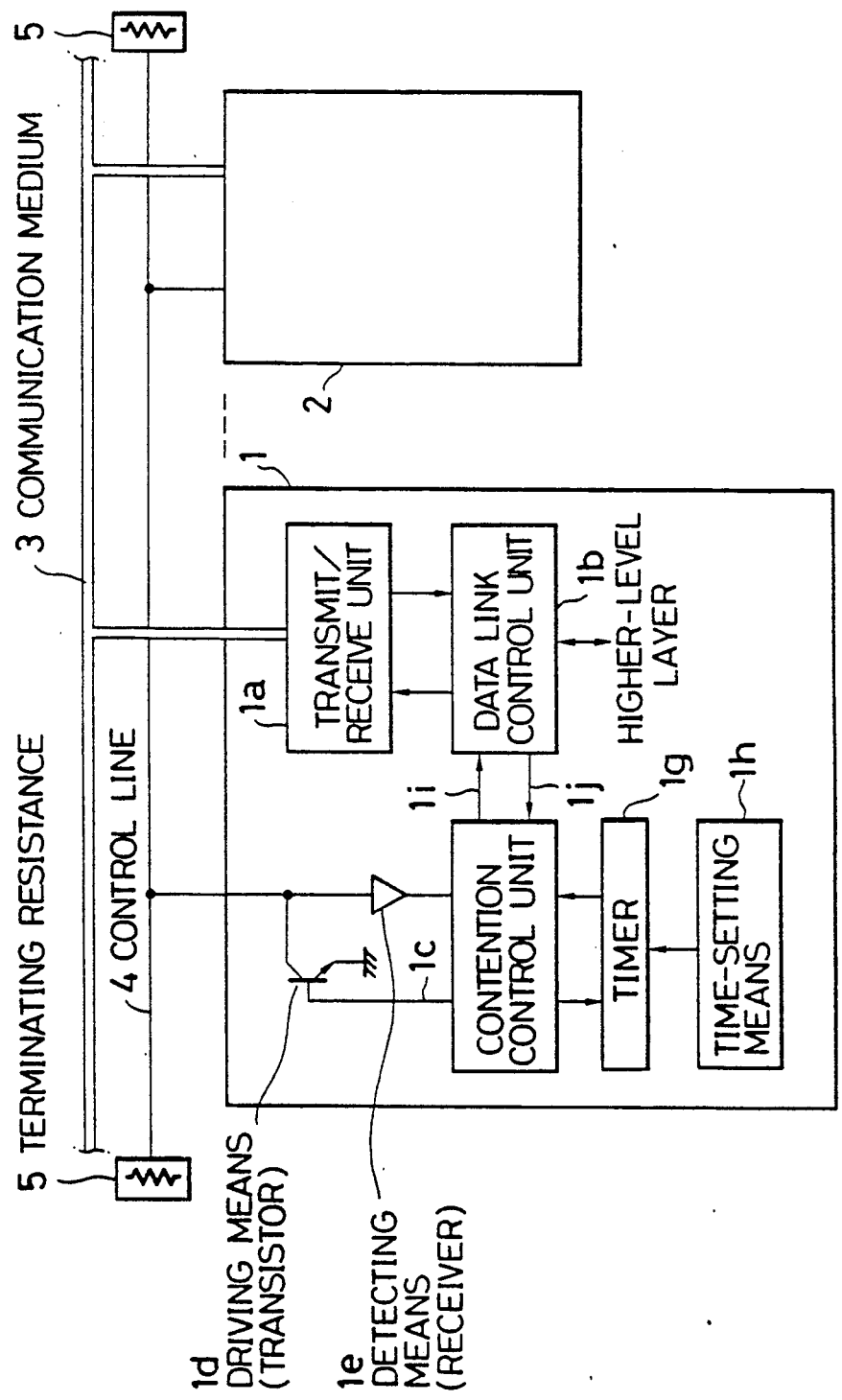
FIG. 5 is a block diagram of a contention control system according to the present invention.

FIG. 5 is a block diagram showing a line interface according to this invention, in which 1 and 2 are functional modules with functions for transmitting and receiving data, 3 is a communication medium shared by these and possibly other functional modules, and 4 is a control line which the functional modules commonly drive and monitor. Terminating resistances 5 can be added if necessary.

Each functional module has a data transmit/receive unit 1a coupled to the communication medium, a data link control unit 1b for performing functions such as error control, a driving means 1d comprising a transistor for activating the control line 4 to which it is coupled by a wired-OR connection, a receiver 1e for detecting the polarity (active or inactive) of the control line 4 and generating a signal indicating whether the control line 4 is active or inactive, a contention control unit 1f for executing a contention control procedure that controls the driving and monitoring of the control line, a timer 1g, and a time setting means 1h.

Figure 6:
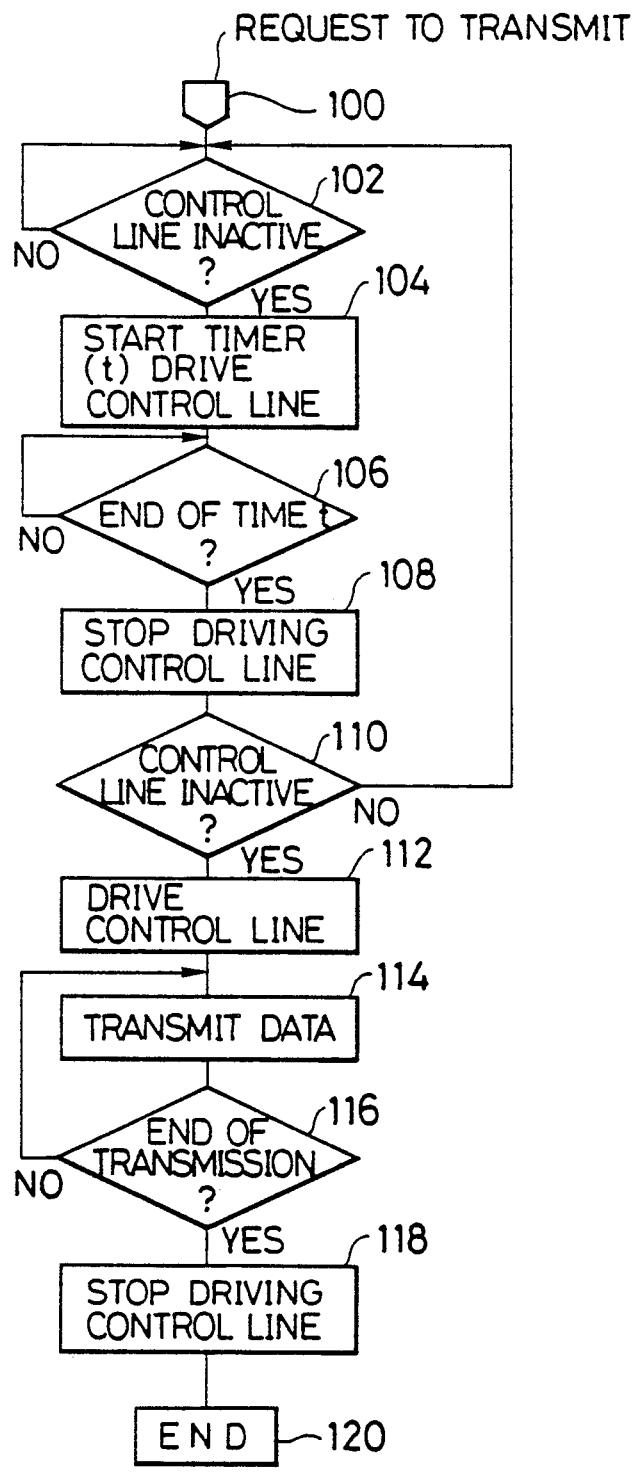
FIG. 6 is a flowchart showing the operation of the contention control system of this invention.

FIG. 6 is a flowchart of the transmission procedure according to this invention. The contention control system operates as described next.

A functional module that has data to transmit sends a request to transmit from the data link control unit 1b to the contention control unit 1f via an information line 1j (100). When it receives this request, the contention control unit reads the polarity of the control line 4 via the receiver 1e to determine whether the control line 4 is active or inactive (102). If the control line 4 is active, indicating that another functional module is using or attempting to use the communication medium 3, the contention control unit 1f enters a waiting loop in which it checks the control line 4 periodically and waits for the control line 4 to become inactive.

When the control line is inactive, the contention control unit 1f turns on the transistor 1d through a lead 1c, thereby driving and thereby activating the control line 4, and simultaneously starts the timer 1g (104). The timer runs for a contention interval of a duration t preset by the time setting means 1h (106). At the end of the contention interval, the contention control unit 1f receives a signal from the timer 1g and turns off the transistor 1d (108).

The contention control unit 1f now checks the state of the control line 4 again (110). If the control line 4 is active, which may occur if another functional module is contending for the right to transmit, the contention control unit returns to the step 102 and enters the waiting loop again. If the control line 4 is inactive, which occurs if no other functional module is contending for the right to transmit, the contention control unit 1f again turns on the transistor 1d to reactivate the control line 4 (112) and simultaneously commands the data link control unit 1b to begin transmitting data on the communication medium 3 (114). At the end of the data transmission (116), the contention control unit 1f turns off the transistor 1d. As a result, transistor 1d stops conducting thereby causing the control line 4 to be deactivated making the communication medium available to other functional modules (118).

The contention interval t should preferably be set to a different value in each functional module. Functional modules with longer contention intervals will have higher priority.

FIG. 7 is a timing chart showing how this control system resolves contention and avoids collisions. In FIG. 7 the communication medium is shared by three functional modules: module 1, module 2, and module 3. The bottom line in FIG. 7 indicates the state of the control line 4 (which is active Low). The next three lines indicate whether each module is driving (Low) or not driving (High) the control line 4.

Originally the module 3 is transmitting data on the communication medium while modules 1 and 2 are both waiting to obtain the right to transmit (102 in FIG. 6). The control line 4 remains active until the end of data transmission by module 3, at which time the control line 4 becomes inactive. Modules 1 and 2 detect the inactive state and begin contending for the right to transmit by activating the control line for intervals t1 and t2, respectively (104). The interval t1 is longer than the interval t2. At the end of time t2 module 2 stops driving the control line (108), checks its state (110), finds it still active, and reverts to the waiting loop (102).

At the end of time t1 module 1 also stops driving the control line 4 (108) and checks its state (110). Since it finds the control line 4 inactive, it commences data transmission (112, 114). During data transmission, module 1 holds the control line 4 in the active state.

At the end of time t1 (116, 118) module 2 also detects the inactive state (102) and once again contends for the right to transmit by driving the control line 4 for the interval t2 (104, 106). At the end of time t2 (108), however, it finds that the control line 4 is active because module 1 is now transmitting data (110). Module 2 then returns to the waiting state (102) until module 1 finishes transmitting.

An advantage of this contention control system is that it avoids collisions of data on the communication medium 3. Accordingly, it does not require a data retransmission procedure.

Another advantage of this contention control system is that it is simple and inexpensive to implement. Its control procedure can be executed using only part of the processing capability of a microprocessor or other control device in each functional module.

This invention places no restrictions whatsoever on the type or the number of lines of the communication medium 3, which may be, for instance, a 2- or 4-wire paired cable, a coaxial cable, or a fiber-optic cable. It is also possible for the communication medium 3 to be an external communication bus in which one of the lines is reserved for use as the control line.

In this embodiment the contention interval was determined by a timer and time setting means, but the invention is not restricted to this design. Other timing means can be employed, such as dedicated hardware means, or software means making use of a microprocessor and memory.

What is claimed is:

1. A contention control system for a single communication medium shared by a plurality of independent functional modules, comprising:
   a control line separate from the communication medium; and
   control means in the respective functional modules for checking said control line prior to data transmission, waiting for said control line to become inactive, activating said control line for a predetermined contention interval, then checking said control line again and reverting to the waiting state if said control line is active, or if said control line is inactive, reactivating said control line, commencing data transmission, and holding said control line in the active state for the duration of the data transmission.

2. A contention control system according to claim 1, wherein said control means comprises:
   driving means coupled to said control line, for activating said control line;
   receiver means coupled to said control line, for detecting whether said control line is active or inactive;
   timing means for determining the length of said contention interval; and
   a control unit connected to said driving means, said receiver means, and said timing means, for receiving a signal from said receiver means indicating whether said control line is inactive, turning said driving means on when said control line is found inactive, turning said driving means off at the end of said contention interval as determined by said timing means, and turning said driving means on and off at the beginning and end of data transmission.

3. A contention control system according to claim 2, in which said timing means comprises a timer for measuring the length of said contention interval and time setting means for presetting said timer.

4. A contention control system according to claim 1, wherein respective functional modules employ contention intervals of different lengths.

5. A contention control system according to claim 4, where functional modules of higher priorities employ contention intervals of longer lengths.

6. A method of contention control within a communication medium shared by a plurality of independent functional modules coupled thereto for at least transmitting data over the communication medium, the communication medium being associated with a control line connected to the functional nodes, each of the functional modules being operable for activating the control line and also for checking the state of the control line, the method comprising, for a functional module having data to transmit on the communication medium, the steps of:
   (a) checking the state of the control line to determine if the control line is inactive;
   (b) activating, if the control line is determined to be inactive, the control line for a predetermined contention interval;
   (c) checking the state of the control line to determine if the line is inactive;
   (d) reactivating the control line; and
   (e) commencing data transmission and holding the control line in the active state for the duration of the data transmission.

7. The method of claim 6, wherein the functional modules employ contention intervals of different lengths.

8. The method of claim 7, wherein functional modules of higher priorities employ contention intervals of longer lengths.

9. A contention control system for a single communication medium, comprising:
   a control line separate from said communications medium; and
   a plurality of independent functional modules, each of said modules including
      a transmit/receive unit coupled to said single communications medium;
      a data link control unit coupled to said tranmit/receive unit;
      a receiver coupled to said control line, said receiver generating a signal indicative of whether said control line is active or inactive;
      a driving means coupled to said control line for the activation of said control line when said control line is inactive;
      timing means; and
      a contention control unit coupled to said data link control unit, receiver, driving means and timing means, said contention control unit (1) turning on said driving and timing means when said receiver indicates that said control line is inactive thereby activating said control line, (2) turning off said driving means at the end of a predetermined contention interval set by said timing means thereby deactivating said control line, (3) again turning on said driving means when said receiver indicates that said control line is inactive to again activate said control line while simultaneously commanding said data link control unit to begin transmission of data by said transmit/receive unit on said communication medium, and (4) at the end of said data transmission turning off said driving means thereby deactivating said control line and making said communication medium available to other function modules.

10. A contention control system according to claim 9 wherein said timing means includes a timer for measuring the length of said contention interval and time setting means for presetting said timer.

11. A contention control system according to claim 9, wherein respective functional modules employ contention intervals of different lengths.

12. A contention control system according to claim 10, wherein respective functional modules employ contention intervals of different lengths.

13. A contention control system according to claim 9 wherein said driving means includes a transistor having one electrode connected between said receiver and said control line, and a second electrode connected to said contention control unit.

* * * * *